US010864916B2

(12) United States Patent
Hagenlocher

(10) Patent No.: US 10,864,916 B2
(45) Date of Patent: Dec. 15, 2020

(54) METHOD AND DEVICE FOR DETERMINING A COEFFICIENT OF FRICTION OF A PASSABLE SUPPORTING SURFACE WITH THE AID OF AN EGO VEHICLE

(71) Applicant: Robert Bosch GmbH, Stuttgart (DE)

(72) Inventor: Nils Hagenlocher, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 16/089,059

(22) PCT Filed: Mar. 16, 2017

(86) PCT No.: PCT/EP2017/056282
§ 371 (c)(1),
(2) Date: Sep. 27, 2018

(87) PCT Pub. No.: WO2017/167583
PCT Pub. Date: Oct. 5, 2017

(65) Prior Publication Data
US 2019/0118821 A1    Apr. 25, 2019

(30) Foreign Application Priority Data

Apr. 1, 2016   (DE) .......................... 10 2016 205 430

(51) Int. Cl.
*B60W 40/068* (2012.01)
*B60W 50/00* (2006.01)
*B60W 50/02* (2012.01)

(52) U.S. Cl.
CPC ...... *B60W 40/068* (2013.01); *B60W 50/0205* (2013.01); *B60W 2050/0077* (2013.01);
(Continued)

(58) Field of Classification Search
CPC .......... B60W 40/068; B60W 50/0205; B60W 2555/20; B60W 2556/50; B60W 2420/42;
(Continued)

(56) References Cited

U.S. PATENT DOCUMENTS 6,163,747 A     12/2000 Matsuno
2004/0204812 A1*  10/2004 Tran ................. G01S 15/02
                                                  701/80
(Continued)

FOREIGN PATENT DOCUMENTS

DE   102007060858 A1 *  6/2009  ............... G01D 5/39
DE   102007060858 A1     6/2009
(Continued)

OTHER PUBLICATIONS

International Search Report for PCT/EP2017/056282, dated May 24, 2017.

*Primary Examiner* — Behrang Badii
*Assistant Examiner* — Hossam M Abd El Latif
(74) *Attorney, Agent, or Firm* — Norton Rose Fulbright US LLP; Gerard Messina

(57) ABSTRACT

A method and device for determining a coefficient of friction of a passable supporting surface with the aid of an ego vehicle, including a step of acquiring first data values, which represent a moisture level in the surrounding area of the ego vehicle, a step of checking the plausibility of the acquired, first data values by comparison with at least one second data value, and a step of determining third data values, which represent the coefficient of friction of the passable supporting surface; the determination taking place as a function of the plausibility check of the first data values, using the at least one second data value.

10 Claims, 2 Drawing Sheets

(52) U.S. Cl.
 CPC . *B60W 2050/0215* (2013.01); *B60W 2420/42* (2013.01); *B60W 2420/52* (2013.01); *B60W 2555/20* (2020.02); *B60W 2556/50* (2020.02)

(58) Field of Classification Search
 CPC ..... B60W 2420/52; B60W 2050/0077; B60W 2050/0215
 USPC .......................................................... 701/1
 See application file for complete search history.

(56) References Cited

U.S. PATENT DOCUMENTS

| | | | |
|---|---|---|---|
| 2011/0295464 A1* | 12/2011 | Zagorski | B60W 50/06 |
| | | | 701/41 |
| 2012/0167663 A1 | 7/2012 | Groitzsch et al. | |
| 2015/0203107 A1 | 7/2015 | Lippman | |
| 2015/0217759 A1* | 8/2015 | Wimmer | B60W 30/045 |
| | | | 701/22 |
| 2017/0016415 A1* | 1/2017 | Hoshika | F02M 35/10393 |
| 2017/0210380 A1* | 7/2017 | Hegemann | G01S 19/14 |

FOREIGN PATENT DOCUMENTS

| | | | | |
|---|---|---|---|---|
| DE | 102010048927 A1 | | 4/2011 | |
| DE | 102013223367 A1 | | 5/2015 | |
| DE | 102013226631 A1 | * | 6/2015 | ....... G08G 1/096758 |
| DE | 102013226631 A1 | | 6/2015 | |
| DE | 102014219493 A1 | | 3/2016 | |
| KR | 20140133162 A | | 11/2014 | |
| WO | 2009074690 A1 | | 6/2009 | |
| WO | 2010019045 A1 | | 2/2010 | |
| WO | 2015074744 A1 | | 5/2015 | |

* cited by examiner

METHOD AND DEVICE FOR DETERMINING A COEFFICIENT OF FRICTION OF A PASSABLE SUPPORTING SURFACE WITH THE AID OF AN EGO VEHICLE

FIELD OF THE INVENTION

The present invention relates to a method and a device for determining a coefficient of friction of a passable supporting surface (140) with the aid of an ego vehicle.

BACKGROUND INFORMATION

Patent document WO 2015/074744 A1 discusses a method and a device for calculating a coefficient of friction between at least one tire of a vehicle and a road surface. In this context, the calculation is based on different estimation methods, which are each assigned a confidence factor.

Patent document U.S. Ser. No. 00/6,163,747 A discusses a device and a method for ascertaining a coefficient of road friction and relates to, in particular, a device, by which the correct coefficient of friction of the road is recorded in accordance with road conditions present.

Patent document US 2012/0167663 A1 discusses a sensor set-up for measuring the coefficient of friction of a road surface, the sensor set-up being mounted to a motor vehicle and including a radiation emitter unit and at least one electronic evaluation circuit, the radiation emitter unit emitting electromagnetic radiation towards the road surface, and the radiation being reflected and/or scattered at least partially at the road surface, and the reflected and/or scattered radiation being detected at least partially in the radiation emitter unit and/or in one or more additional sensor units; characterized in that the electronic evaluation circuit is configured in such a manner, that it ascertains an information item regarding the coefficient of friction of the road surface, from the intensity of the reflected and/or scattered radiation or a variable dependent on it.

Patent document US 2015/0203107 A1 discusses a system, which includes a computer in a vehicle, the computer including a processor and a storage device, the computer being configured to determine a presence of precipitation, to identify at least one attribute of the precipitation and to determine at least one autonomous control action for the vehicle at least partially on the basis of the precipitation.

SUMMARY OF THE INVENTION

According to the present invention, a method for determining a coefficient of friction of a passable supporting surface with the aid of an ego vehicle is described. The method includes a step of acquiring first data values, which represent a moisture level in the surrounding area of the ego vehicle, a step of checking the plausibility of the acquired, first data values by comparison with at least one second data value, and a step of determining third data values, which represent the coefficient of friction of the passable supporting surface; the determination taking place as a function of the plausibility check of the first data values, using the at least one second data value.

The method described has the advantage that no additional sensors, which are specially configured for determining a coefficient of friction, must be installed in a vehicle, but sensors often already present may be used. In this manner, neither additional space is taken up in or on the vehicle, nor are additional costs generated.

The first data values may be acquired in such a manner, that the moisture in the form of a spray, which is generated by at least one vehicle located in the surrounding area of the ego vehicle and/or by the ego vehicle, is measured; and/or the moisture in the form of swirled-up snow, which is generated by at least one vehicle located in the surrounding area of the ego vehicle and/or by the ego vehicle, is measured.

A vehicle located in the surrounding area of the ego vehicle may be understood as any vehicle located in the sensor range of the ego vehicle. This is regardless of whether it is a vehicle traveling in front of the ego vehicle, a vehicle approaching the ego vehicle, or a vehicle located next to the ego vehicle, such as, for example, on a multilane freeway.

In this instance, spray is to be understood as the moisture, which is either swirled up by the rotation of a wheel of a vehicle located in the surrounding area of the ego vehicle, and/or swirled up by the rotation of a wheel of the ego vehicle.

In this instance, swirled-up snow is to be understood as the moisture, which, due to snow lying on the roadway, is swirled up by the rotation of a wheel of a vehicle located in the surrounding area of the ego vehicle and/or by the rotation of a wheel of the ego vehicle.

In this case, it has proven to be particularly advantageous to measure the moisture in the form of spray and/or swirled-up snow, since both forms of moisture may be measured and evaluated effectively by sensors already present, such as video and/or radar and/or lidar sensors. In this connection, it is of additional benefit to measure one's own spray, which is generated by the wheels of the ego vehicle, since this allows a higher frequency of moisture detection, and consequently, the coefficient of friction may be determined more rapidly and regularly.

It particularly may be provided for the at least one second data value to include a coefficient of friction from a different friction coefficient determination system, in particular, from a brake system for the operational stabilization of the ego vehicle.

In this manner, coefficients of friction may be determined more accurately than when only a single system is utilized for determining the coefficient of friction. This increases the safety of the ego vehicle, as more accurate coefficients of friction may be used.

In one particularly specific embodiment, the at least one second data value includes a value of a water film height.

Values of a water film height are to be understood as data values, which include information about a height of a water film on a passable supporting surface.

This is particularly advantageous for determining the coefficient of friction, since conclusions about the coefficient of friction may be drawn directly from the water film height. The higher a water film on a road, the higher, for example, the risk of hydroplaning, and the lower the coefficient of friction of the road at the corresponding location.

The at least one second data value may include the intensity of precipitation in the form of rain and/or snow, and/or the temperature of the surrounding area of the ego vehicle, and/or the speed of at least one windshield wiper of the ego vehicle, and/or information from a weather forecast valid in the surrounding area of the ego vehicle.

Knowledge of precipitation in the form of rain and/or snow is advantageous, since consequently, conclusions about the coefficient of friction may be drawn, even if the passable supporting surface is, for example, still relatively dry. If, for example, very little spray is still detected, then, using the knowledge of precipitation in the form of rain and/or snow, the actual moisture level, which is to be expected in the near future, may be adjusted, and consequently, a better coefficient of friction may be determined. This may be used, above all, in connection with the weather forecast, in order to include the duration of an instance of precipitation in the determination, as well. Knowledge of the temperature is likewise extremely advantageous, since therefore, one may distinguish between a wet roadway and black ice on the roadway. In addition, knowledge of the speed of a windshield wiper represents a simple option for estimating precipitation.

In one particularly specific embodiment, the third data values are determined in such a manner, that with the aid of a database, the first data values, which have been checked for plausibility using the at least one second data value, are assigned a coefficient of friction, and this coefficient of friction is outputted in the form of third data values.

By assigning coefficients of friction to the acquired and plausibility-checked, first data values with the aid of a database, which already includes coefficients of friction for particular scenarios, a coefficient of friction may be determined rapidly and without high computing expenditure of, for example, a control unit. Therefore, this represents an effective and resource-conserving variant.

In one particularly specific embodiment, the third data values are determined in such a manner, that the third data values determined are linked to the position of the ego vehicle, in particular, to GPS data, and these are transmitted to an external server.

A large, safety-related advantage is apparent here, since the coefficients of friction determined may be processed and, for example, made available to further vehicles in the form of a map, which means that other vehicles may access it, and therefore, that safety-related measures may be planned and/or implemented correspondingly more effectively. In addition, on the basis of the coefficients of friction determined, warnings regarding, for example, particularly slippery sections of a road may be generated and sent to further vehicles.

The device of the present invention for determining a coefficient of friction of a passable supporting surface with the aid of an ego vehicle includes devices for acquiring first data values, which represent a moisture level in the surrounding area of the ego vehicle, second devices for checking the plausibility of the acquired, first data values by comparison with at least one second data value, and third devices for determining third data values, which represent the coefficient of friction of the passable supporting surface; the determination taking place as a function of the plausibility check of the first data values, using the at least one second data value.

The server of the present invention is configured to receive, store and process third data values, which are determined according to the method of the present invention and transmitted with the aid of a device of the present invention.

Advantageous further refinements of the present invention are indicated in the dependent claims and described in the specification.

Exemplary embodiments of the present invention are depicted in the figures and are explained in more detail in the descriptions below.

DETAILED DESCRIPTION

Figure 1:
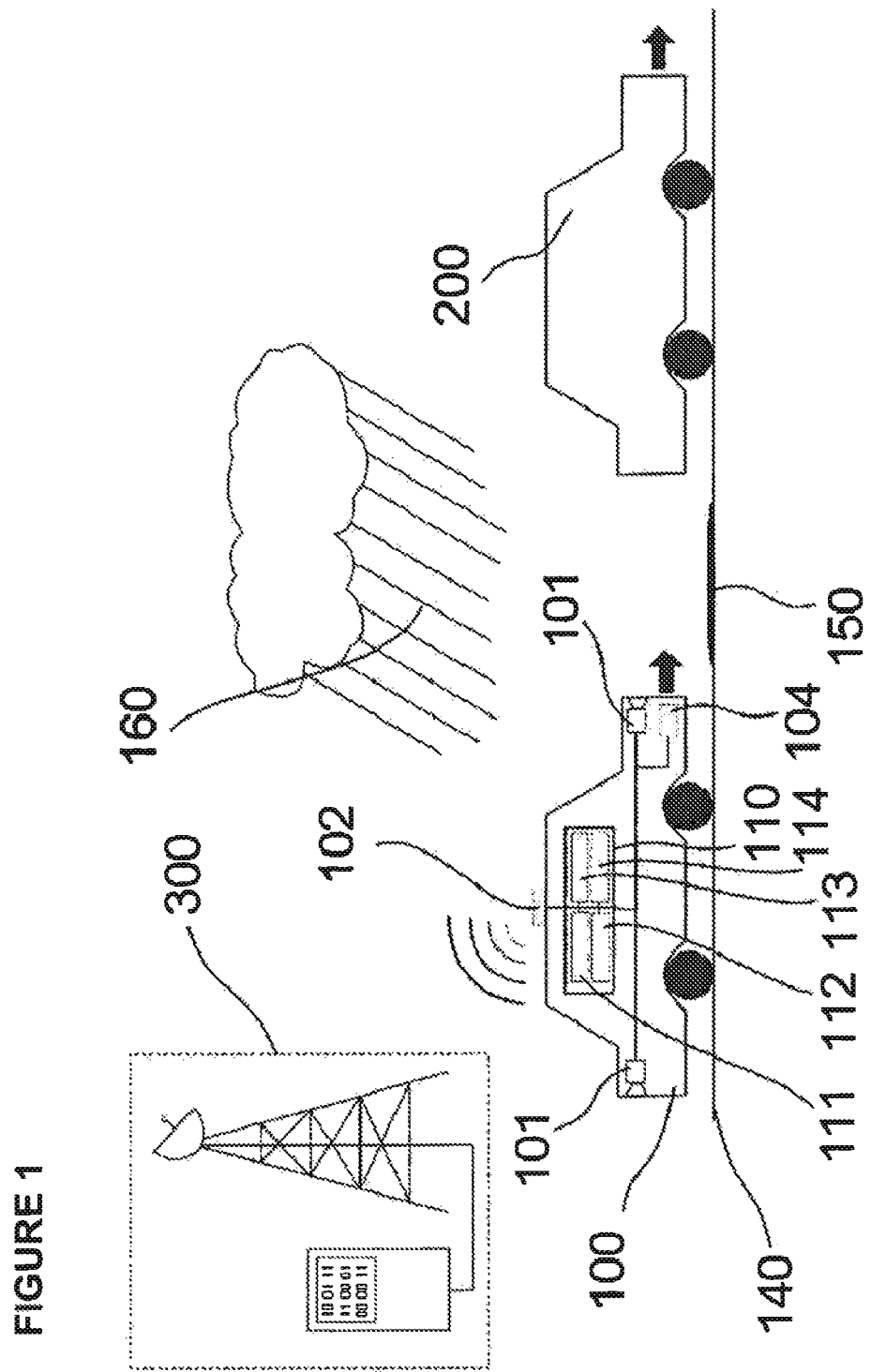
FIG. 1 shows an exemplary embodiment of the method of the present invention, having a vehicle, which the device of the present invention includes, as well as a server.

FIG. 1 shows a possible specific embodiment of the present invention described. In this context, ego vehicle 100 is located on a passable supporting surface 140, behind a vehicle 200 traveling in front. In this case, ego vehicle 100 includes device 110 of the present invention, which includes, in turn, first devices 111 for acquiring first data values, second devices 112 for checking the plausibility of the first data values by comparison with at least one second data value, and third devices 113 for determining third data values, which represent the coefficient of friction of passable supporting surface 140. In addition, the device includes a database 114, which, however, may also be part of third devices 113.

In this context, first devices 111 are configured to be able to access sensors 101, which are part of ego vehicle 100, and to be able to measure a moisture level in the surrounding area of ego vehicle 100. However, these sensors 101 may also be directly part of device 110, as these are contained directly by first devices 111.

In the exemplary embodiment shown here, first devices 111 are configured to be able to access sensors 101 of the ego vehicle that are already present. In this context, sensors 101 may be, for example, radar, lidar or video sensors. In addition, different sensor systems may be interconnected, for example, radar sensors with video sensors. In principle, further sensor systems are possible.

Now, for example, a video and/or radar and/or lidar survey of the surrounding area of ego vehicle 100 may be undertaken, using sensors 101, and evaluated with the aid of first devices 110. For example, video sensors are well-suited to distinguish between a wet or dry supporting surface 140 and a snow- and/or ice-covered supporting surface 140. On the other hand, radar sensors are highly suitable, for example, for distinguishing between a dry and a wet supporting surface 140, as, for example, particularly damp spots 150 on passable supporting surface 140 are detected. In this context, for example, the height of the water film of these damp spots 150 may be measured. In addition, moisture, which is generated, for example, by vehicle 200 traveling ahead, in the form of spray, or, in the case of a snow-covered roadway 140, in the form of swirled-up snow, as well, may be detected with the aid of sensors 101 and correspondingly evaluated by first devices 111 and provided in the form of first data values.

Furthermore, with the aid of sensors 101 and the first devices 111 connected to them, it is also possible to differentiate between precipitation 160, such as rain and/or snow, and a spray and/or swirled-up snow. This may be accomplished, for example, with the aid of a radar sensor, since the spray has a water density different from damp spots 150 on the roadway and from precipitation 160 in the form of rain and/or snow.

In addition, for example, the spray generated by the ego vehicle 100 itself may also be measured in the form of first data values. This is possible, for example, by using sensors 101 directed rearwards. Consequently, the method of the present invention may also be executed without a vehicle 200 located in the surrounding area of ego vehicle 100. In comparison with the spray of a vehicle 200 located in the surrounding area of ego vehicle 100, one's own spray provides even a higher frequency of moisture detection. In this context, of course, sensors 101 of ego vehicle 100 may also be placed in such a manner, that detection of the separate spray of ego vehicle 100 is aided.

In general, the vehicle depicted here as vehicle 200 traveling ahead may also be situated at any other location relative to ego vehicle 100, as long as its spray and/or swirled-up snow is in the range of sensors 101 of the ego vehicle.

First devices 111 are configured to be able to receive and, with the aid of suitable software, to evaluate signals of sensors 101, and to include all of the technical devices necessary for this (such as a working memory, a hard disk and a processor).

After the acquisition of the first data values with the aid of first devices 111, the first data values are checked for plausibility by comparison with at least one second data value. This is accomplished with the aid of the second devices 112 for checking for plausibility. In this context, the at least one second data value may be, for example, a coefficient of friction of a different friction coefficient determination system 104, such as a brake system for operational stabilization.

In addition, the at least one second data value may also be a temperature value, which is measured by a sensor 101 of the ego vehicle, as well. In this manner, for example, a damp spot 150 on passable supporting surface 140 may be recognized as a wet spot, if the temperature is suitably high, or also as ice on roadway 140, if the temperature is suitably low. One further possibility is that the at least one second data value include the speed of the windshield wiper, since from the movement of the windshield wiper, it may also be determined whether precipitation 160 is heavy or light.

In addition, it is possible to obtain the at least one second data value from an external source with the aid of a transceiver unit 102. It may be an internet service, which provides weather data, or also a weather station in the vicinity of the ego vehicle, which transmits weather data, or also weather information, which is provided, for example, by a radio station. In one alternative embodiment, for example, coefficients of friction may be determined more effectively by determining damp spots 150 on passable supporting surface 140, if these damp spots 150 are correspondingly checked for plausibility, using the severity of precipitation 160 already occurred, based on weather data received.

Third devices 113 are configured in such a manner, that on the basis of the acquired, first data values, which have been checked for plausibility by comparison with the at least one second data value, third data values are determined, which represent a coefficient of friction of passable supporting surface 140 in the surrounding area of ego vehicle 100.

In this context, the coefficient of friction may be determined, for example, since coefficients of friction are already stored in a database 114, as a function of parameters. By directly comparing the first data values and the at least one second data value to these parameters stored in database 114, a coefficient of friction may subsequently be determined and outputted in the form of third data values.

The following table shows purely illustratively, how a coefficient of friction is selected as a function of acquired, first data values and at least one second data value. The data used here are selected purely by way of example, are not complete, and are only used to illustrate the exemplary embodiment described here:

| First Data Values | Second Data Values (Image Processing Method) | Second Data Values (Speed of the Windshield Wiper) | Second Data Values (Temperature) | Second Data Values (ESP Friction Coefficient) | Third Data Values (Coefficient of Friction Determined) |
| --- | --- | --- | --- | --- | --- |
| Light spray | No precipitation | Zero | >+4° C. | High | >0.8 |
| Light spray | Light rain | Low | >+4° C. | High | >0.6 |
| Heavy spray | Moderate rain | Medium | >+4° C. | High | >0.6 |
| Heavy spray | Heavy rain | High | >+4° C. | Medium | >0.6 |
| Medium spray | Moderate snowfall | Medium | >0° C. | Medium | 0.3-0.6 |

For example, the first data values may represent a light spray, and the at least one second value may represent a low speed of the windshield wiper, through which a coefficient of friction >0.6 is determined. If the first data values represent a heavy spray and at least two second data values represent a temperature of >4° C. and heavy rain, a coefficient of friction of >0.6 is determined.

In addition, with the aid of transceiver unit 102, the position of ego vehicle 100 may be determined, for example, in the form of GPS data, which may be added to the third data values, which therefore means that a particular coefficient of friction is linked to a specific position. These third data values may then be transmitted, for example, to an external server 300.

External server 300 is configured to receive and process the coefficients of friction in the form of third data values, together with positional data. This may be understood to mean, for example, that using the location-specific coefficients of friction, a friction coefficient map is generated, which may be made available, for example, to other vehicles and/or to ego vehicle 100.

Of course, further exemplary embodiments and combined forms of the depicted examples are possible.

Figure 2:
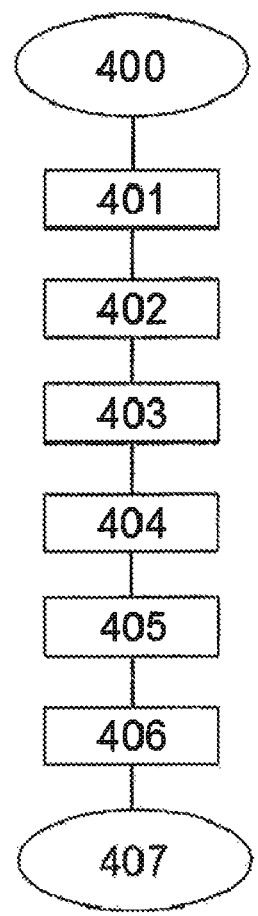
FIG. 2 shows a flow chart of the method according to the present invention.

FIG. 2 shows a flow chart of an exemplary embodiment of the method according to the present invention.

The method begins at step 400.

In step 401, first data values are acquired, which represent a moisture level in the surrounding area of the ego vehicle.

In step 402, these first data values acquired in step 401 are checked for plausibility by comparison with at least one second data value. This at least one second data value may be both determined by sensors 101 of ego vehicle 100 and received from an external source with the aid of transceiver unit 102.

In step 403, third coefficients of friction are determined, which represent a coefficient of friction of passable supporting surface 140; the determination taking place as a function of the plausibility check of the first data values, using the at least one second data value.

In step 404, the third data values determined are transmitted to an external server 300.

In step 405, the data transmitted in step 404 are received by external server 300.

In step 406, a friction coefficient map is generated from the data received.

In step 407, the method ends.

What is claimed is:

1. A method for determining a coefficient of friction of a passable supporting surface with the aid of an ego vehicle, the method comprising:
   acquiring first data values, which represent a moisture level of water in a non-gaseous state in the surrounding area of the ego vehicle;
   checking a plausibility of the acquired, first data values by comparing at least one second data value; and
   determining third data values, which represent the coefficient of friction of the passable supporting surface, wherein the determination takes place as a function of the plausibility check of the first data values, using the at least one second data value, wherein the first data values are acquired by measuring the moisture in the form of: (i) a spray, which is generated by at least one vehicle located in the surrounding area of the ego vehicle and/or by the ego vehicle, and/or (ii) in the form of swirled-up snow, which is generated by at least one vehicle located in the surrounding area of the ego vehicle and/or by the ego vehicle.

2. The method of claim 1, wherein the at least one second data value includes a coefficient of friction from a different friction coefficient determination system.

3. The method of claim 1, wherein the at least one second data value includes a value of a water film height.

4. The method of claim 1, wherein the at least one second data value includes at least one of: an intensity of precipitation in the form of rain and/or snow, and/or a temperature of the surrounding area of the ego vehicle, and/or a speed of at least one windshield wiper of the ego vehicle, and/or information from a weather forecast valid in the surrounding area of the ego vehicle.

5. The method of claim 1, wherein the third data values are determined in such a manner, that with the aid of a database, the first data values, which are checked for plausibility, using the at least one second data value, are assigned a coefficient of friction, and the coefficient of friction is outputted in the form of third data values.

6. The method of claim 1, wherein the third data values are determined in such a manner, that the third data values determined are linked to the position of the ego vehicle, and these are transmitted to an external server.

7. A device for determining a coefficient of friction of a passable supporting surface with the aid of an ego vehicle, comprising:
   at least one first device for acquiring first data values, which represent a moisture level of water in a non-gaseous state in the surrounding area of the ego vehicle;
   at least one second device for checking the plausibility of the acquired, first data values by comparison with at least one second data value; and
   at least one third device for determining third data values, which represent the coefficient of friction of the passable supporting surface, wherein the determination takes place as a function of the plausibility check of the first data values, using the at least one second data value, wherein the first data values are acquired by measuring the moisture in the form of: (i) a spray, which is generated by at least one vehicle located in the surrounding area of the ego vehicle and/or by the ego vehicle, and/or (ii) in the form of swirled-up snow, which is generated by at least one vehicle located in the surrounding area of the ego vehicle and/or by the ego vehicle.

8. A server for determining a coefficient of friction of a passable supporting surface with the aid of an ego vehicle, comprising:
   a server arrangement configured to receive, store and process third data values;
   wherein the third data values are determined by performing the following:
      acquiring first data values, which represent a moisture level of water in a non-gaseous state in the surrounding area of the ego vehicle;
      checking a plausibility of the acquired, first data values by comparing at least one second data value; and
      determining the third data values, which represent the coefficient of friction of the passable supporting surface, wherein the determination takes place as a function of the plausibility check of the first data values, using the at least one second data value wherein the first data values are acquired by measuring the moisture in the form of: (i) a spray, which is generated by at least one vehicle located in the surrounding area of the ego vehicle and/or by the ego vehicle, and/or (ii) in the form of swirled-up snow, which is generated by at least one vehicle located in the surrounding area of the ego vehicle and/or by the ego vehicle.

9. The method of claim 1, wherein the at least one second data value includes a coefficient of friction from a different friction coefficient determination system, in particular, from a brake system for the operational stabilization of the ego vehicle.

10. The method of claim 1, wherein the third data values are determined in such a manner, that the third data values determined are linked to the position of the ego vehicle, in particular, to GPS data, and these are transmitted to an external server.

* * * * *